United States Patent
Lehtimäki et al.

(10) Patent No.: US 12,292,598 B2
(45) Date of Patent: May 6, 2025

(54) POLARIZING DEVICE

(71) Applicant: Teknologian tutkimuskeskus VTT Oy, Espoo (FI)

(72) Inventors: Lauri Lehtimäki, VTT (FI); Mikko Harjanne, VTT (FI); Matteo Cherchi, VTT (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 249 days.

(21) Appl. No.: 18/001,974

(22) PCT Filed: Jun. 18, 2021

(86) PCT No.: PCT/FI2021/050468
§ 371 (c)(1),
(2) Date: Dec. 15, 2022

(87) PCT Pub. No.: WO2021/255347
PCT Pub. Date: Dec. 23, 2021

(65) Prior Publication Data
US 2023/0333321 A1    Oct. 19, 2023

(30) Foreign Application Priority Data
Jun. 18, 2020  (FI) ..................... 20205645

(51) Int. Cl.
*G02B 6/27* (2006.01)
*G02B 6/28* (2006.01)

(52) U.S. Cl.
CPC ......... *G02B 6/2726* (2013.01); *G02B 6/2813* (2013.01)

(58) Field of Classification Search
CPC .......................... G02B 6/2813; G02B 6/2726
See application file for complete search history.

(56) References Cited

U.S. PATENT DOCUMENTS 9,405,066 B2    8/2016  Mahgerefteh et al.
10,429,581 B1 * 10/2019  Thomas ................. G02B 6/126
(Continued)

FOREIGN PATENT DOCUMENTS

| EP | 0389172 A2 | 9/1990 |
| JP | 2015135409 A | 7/2015 |
| KR | 20180114559 A | 10/2018 |

OTHER PUBLICATIONS

Finnish Patent and Registration Office, Office Action, U.S. Appl. No. 20/205,645, Mailed Feb. 8, 2021, 11 pages.
(Continued)

*Primary Examiner* — Chad H Smith
(74) *Attorney, Agent, or Firm* — Ziegler IP Law Group, LLC.

(57) ABSTRACT

A polarizing device includes:
a first waveguide to guide input light,
a second waveguide to guide TE-polarized light,
wherein the second waveguide includes a tapered input portion to polarization-selectively couple TE-polarized light from the first waveguide to the second waveguide, wherein the tapered input portion symmetrically overlaps the first waveguide, and the thickness of the tapered input portion has been selected to substantially prevent coupling of TM-polarized light from the first waveguide to the second waveguide, wherein the refractive index of the second waveguide is higher than the refractive index of the first waveguide.

15 Claims, 7 Drawing Sheets

(56) References Cited

U.S. PATENT DOCUMENTS

2008/0253728 A1 10/2008 Sparacin et al.
2019/0025506 A1 1/2019 Park

OTHER PUBLICATIONS

Huang et al, "Broadband Integrated optic polarization splitters by incorporating polarization mode extracting waveguide", Scientific Reports, vol. 7, 7246, DOI: 10.1038/s41598-017-05324-x, Jul. 6, 2017, 7 pages.

Huang et al, Integrated optic polarization splitter based on total internal reflection from a birefringent polymer, Optic Express, vol. 24, No. 18, http://dx.doi.org/10.1364/OE.24.021012, 99 21012-21019, Aug. 31, 2016, 8 pages.

International Search Report, Application No. PCT/FI2021/050468, Mailed Sep. 7, 2021, 6 pages.

Ma et al, "A Compact Silicon-on-Insulator MMI-based Polarization Splitter", Optical MEMS and Nanophotonics, 2007 IEEE/LEOS International Conference, XP0322666+9, ISBN: 978-1-4244-0641-8, Aug. 1, 2007, 2 pages.

Shani et al, "Integrated Optic Adiabatic Devices on Silicon", IEEE Journal of Quantum Electronic, IEEE Service Center, col. 27, No. 3, XP011478442, ISSN: 0018-9197, DOI: 10.1109/3.81363, Mar. 1, 1991, 11 pages.

Tu et al., "A compact DOI polarization beam splitter based on multimode interference coupler", Passive Components and Fiber-based Devices VIII, SPIE, vol. 8307, No. 1, XP060024652, DOI: 10.1117/12.905589, Dec. 28, 2011, 6 pages.

Written Opinion of The International Searching Authority, Application No. PCT/FI2021/050468, Mailed Sep. 7, 2021, 10 pages.

\* cited by examiner

Cross section A-A

POLARIZING DEVICE

FIELD

The aspects of the disclosed embodiments relates to polarization-selective filtering of light.

BACKGROUND

It is known that a polarizing splitter may be implemented e.g. by using birefringent material. The refractive index of birefringent material depends on the polarization of light with respect to the orientation of a crystal structure of the birefringent material. The polarizing splitter may form first output light and a second output light from input light. The first output light may be spatially separate from the second output light. The first output light may have a first polarization and the second output light may have a second different polarization.

SUMMARY

An object is to provide a polarizing device. An object is to provide a method for polarization-selective filtering of light. An object is to provide a polarizing beam splitter.

According to an aspect, there is provided a polarizing device (500), comprising:
  a first waveguide (WG1) to guide input light (LB0),
  a second waveguide (WG2) to guide TE-polarized light (LB2),
  wherein the second waveguide (WG2) comprises a tapered input portion (TAP1) to polarization-selectively couple TE-polarized light from the first waveguide (WG1) to the second waveguide (WG2), wherein the tapered input portion (TAP1) symmetrically overlaps the first waveguide (WG1), and the thickness ($h_2$) of the tapered input portion (TAP1) has been selected to substantially prevent coupling of TM-polarized light from the first waveguide (WG1) to the second waveguide (WG2), wherein the refractive index ($n_2$) of the second waveguide (WG2) is higher than the refractive index ($n_1$) of the first waveguide (WG1).

The scope of protection sought for various embodiments of the present disclosure is set out by the independent claims. The embodiments, if any, described in this specification that do not fall under the scope of the independent claims are to be interpreted as examples useful for understanding various embodiments of the present disclosure.

The first waveguide may also be called e.g. as a lower waveguide, and the second waveguide may be called e.g. as an upper waveguide. The polarizing device may be implemented e.g. on a substrate such that the lower waveguide is between the upper waveguide and the substrate.

The refractive index of the tapered input portion may be higher than the refractive index of the first lower waveguide. The lower waveguide may comprise e.g. crystalline silicon, and the upper waveguide may comprise e.g. amorphous silicon, so as to provide the difference between the refractive indices. The geometry of the thin planar tapered input portion and the refractive index difference may allow polarization-selective coupling of TE mode from the lower waveguide to the tapered input portion of the upper second waveguide.

The first lower waveguide may receive input light, which comprises a TE polarized mode and a TM polarized mode. The polarizing device may operate by coupling one of the polarization modes from the lower to the upper waveguide, leaving the other polarization mode to propagate in the lower waveguide. The coupling may be achieved by using the tapered input portion of the upper waveguide. The upper (amorphous silicon) waveguide may have a higher refractive index when compared with the refractive index of the lower waveguide. TE-polarized light which is coupled from the lower waveguide to the upper waveguide may remain trapped and confined within the upper waveguide due to the refractive index difference. TE-polarized light which is coupled from the lower waveguide to the tapered input portion of the upper waveguide may form TE-polarized light, which propagates within the so upper waveguide.

On the other hand, the thickness of the upper waveguide may be so small that the upper waveguide does not effectively confine TM polarized light. Consequently, TM-polarized light which might escape from the lower waveguide to the upper waveguide is returned to the lower waveguide.

The tapered form of the input portion may enable gradual coupling of the TE polarization from the lower waveguide to the upper waveguide. The tapered form of the input portion may enable adiabatic coupling of the TE polarization to the upper waveguide.

The polarizing device may allow varying the wavelength ($\lambda_0$) of the input light in a wide range and/or the polarizing device may allow operation with a broad linewidth ($\Delta\lambda_0$) of the input light. The polarizing device may be tolerant to a change of linewidth ($\Delta\lambda_0$) of the input light and/or may be tolerant to a change of wavelength ($\lambda_0$) of the input light.

The polarizing device may be implemented e.g. by using silicon-on-insulator waveguides. A thin tapered input portion of the upper waveguide may be placed on top of a first lower waveguide. The first lower waveguide may be e.g. crystalline silicon waveguide, and the upper waveguide may be e.g. an amorphous silicon waveguide. A thin silica layer may be optionally disposed between the lower waveguide and the upper tapered input portion. The thin silica layer may e.g. facilitate manufacturing of the different waveguiding layers of the device.

The polarizing device may comprise an output portion to provide output light such that the first waveguide and the output portion are at the same vertical level. Providing the output at the same vertical level may e.g. facilitate integrating the polarizing device e.g. as a part of a photonic integrated circuit.

The polarizing device may comprise a second coupling structure for coupling polarized light from the upper waveguide to the output portion, which may be located at the same height level as the first waveguide. In particular, TE-polarized light propagating in the upper waveguide may be brought down. The mode propagating in the upper waveguide can be brought down by using a second coupling structure. The second coupling structure may be inverted when compared with the first coupling structure, which brought the mode up in the first place.

Figure 1A:
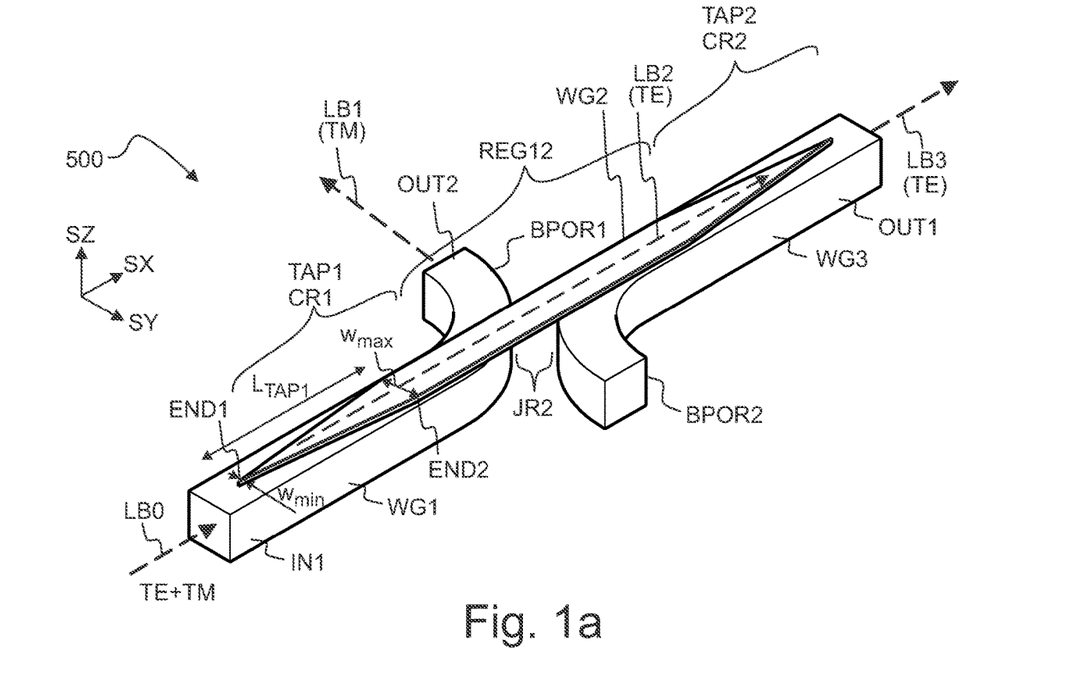
FIG. 1a shows, by way of example, in a three-dimensional view, a polarizing device.

Before bringing the upper TE polarized mode down, the two propagating modes (TE and TM) may be horizontally separated. The propagating modes (TE and TM) may be horizontally separated e.g. by using a bent portion of the lower waveguide (FIG. 1a).

The propagating modes (TE and TM) may be horizontally separated e.g. by using a transverse coupling region (FIGS. 4a to 6b). The transverse coupling region may also mechanically support the upper waveguide from below. In an embodiment, the entire length of the upper waveguide may be supported by a lower continuous layer of material. A first input portion of the lower continuous layer may be arranged to operate as the waveguiding core of the first lower waveguide, for receiving input light. A second output portion of the lower continuous layer may be arranged to operate as the waveguiding core of the output waveguide portion, for providing TE-polarized light. A third intermediate portion of the lower continuous layer may be arranged to couple TM polarized light in a transverse direction, away from the second output portion.

Thus, the entire length of the upper waveguide may be supported by the same waveguiding material layer. This may facilitate manufacturing of the polarizing device because there is no need to use additional filler material between the substrate and the upper waveguide in order to support a bridge portion of the upper waveguide. The material layer may be substantially homogeneous. Supporting the entire length of the upper waveguide with the same material layer may improve mechanical stability of the polarizing device. Supporting the entire length of the upper waveguide with the same material layer may improve the capability of the polarizing device to withstand mechanical shocks and/or to withstand changes of operating temperature.

An input portion, an intermediate portion, and an output portion of the lower continuous layer may mechanically support the upper waveguide from below. The intermediate portion may operate as a transverse coupling region to couple TM polarized light in a transverse direction away from the output portion of the lower continuous layer, and to support the upper waveguide from below.

Figure 4A:
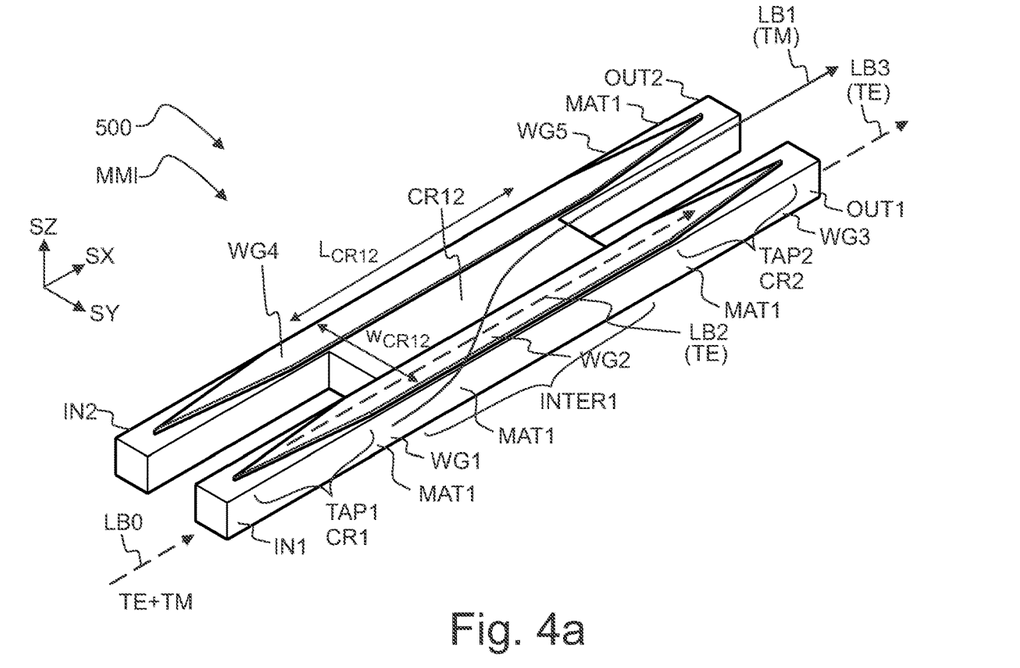
FIG. 4a shows, by way of example, in a three-dimensional view, a polarizing device, which comprises a multi-mode interference coupler.

In an embodiment, the polarizing device may comprise a multi-mode interference coupler to horizontally separate the TM mode propagating in the lower material layer from the TE mode propagating in the upper waveguide (see FIG. 4a). The multi-mode interference coupler may be arranged to couple TM polarized light in a transverse direction away from an output portion of the lower continuous layer. The multi-mode interference coupler may also operate as the intermediate supporting portion, which supports the upper waveguide from below.

Figure 5A:
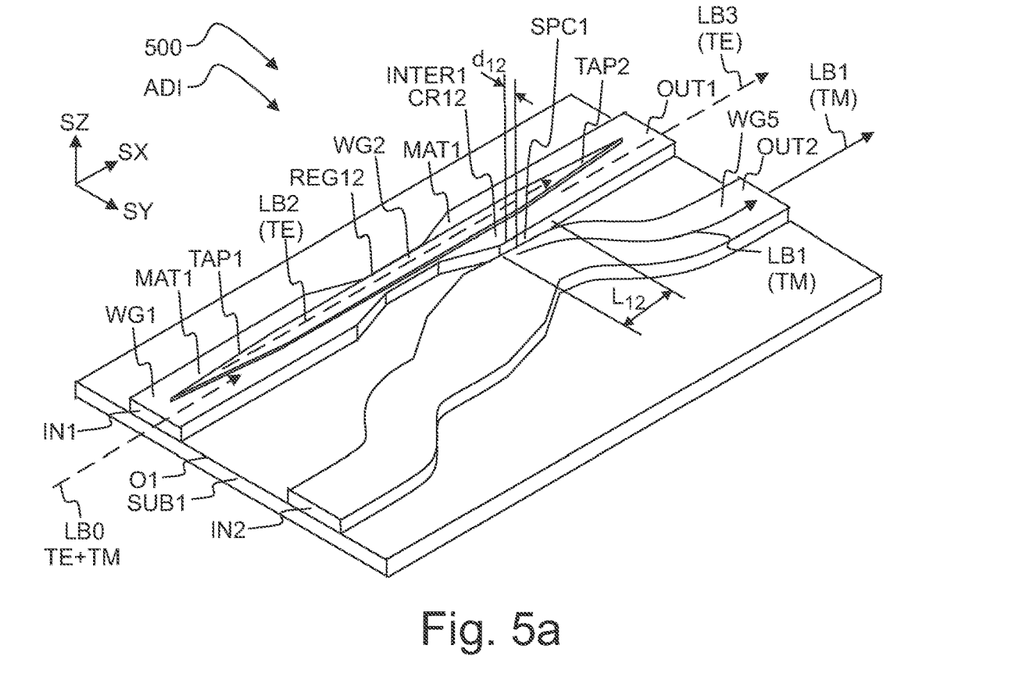
FIG. 5a shows, by way of example, in a three-dimensional view, a polarizing device, which comprises a directional coupler.

In an embodiment, the polarizing device may comprise a directional coupler to horizontally separate the TM mode propagating in the lower material layer from the TE mode propagating in the upper waveguide (see FIG. 5a). A transverse coupling region may be arranged to couple TM polarized light in a transverse direction away from an output portion of the lower continuous layer.

The transverse coupling region may also operate as the intermediate supporting portion, which supports the upper waveguide from below.

Figure 6A:
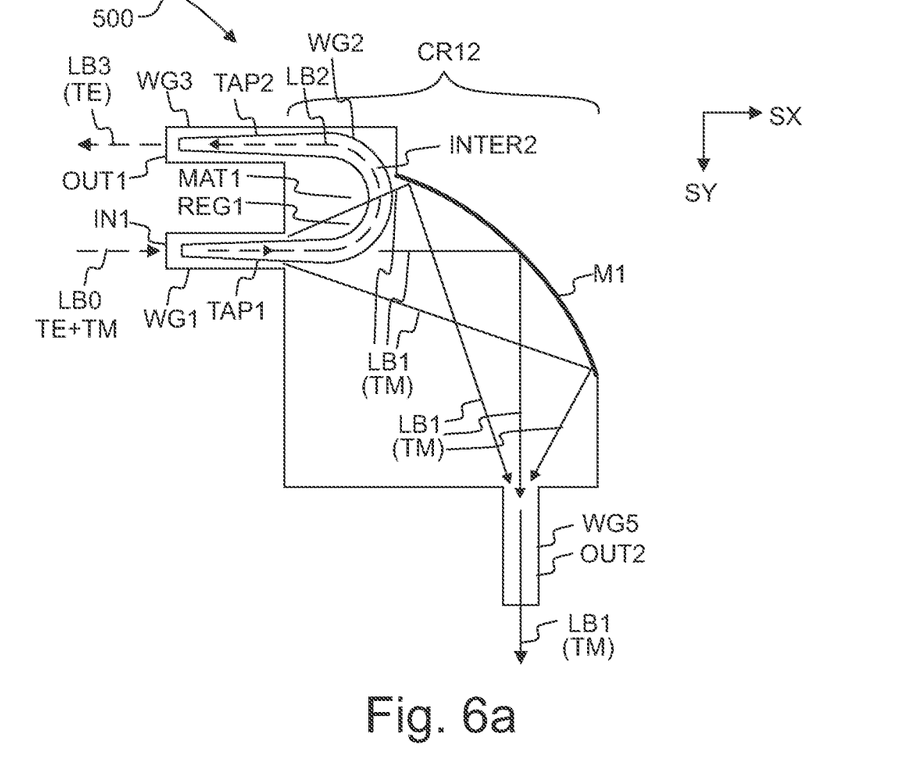

In an embodiment, the polarizing device may comprise an expansion region and collecting optics to horizontally separate the TM mode propagating in the lower material layer from the TE mode propagating in the upper waveguide (see FIG. 6a). The expansion region may be arranged to couple TM polarized light in a transverse direction away from an output portion of the lower continuous layer. The expansion region may also operate as the intermediate supporting portion, which supports the upper waveguide from below.

BRIEF DESCRIPTION OF THE DRAWINGS

In the following examples, several variations will be described in more detail with reference to the appended drawings, in which.

DETAILED DESCRIPTION

Referring to FIG. 1a, the polarizing device 500 may comprise a first waveguide WG1 for receiving and guiding input light LB0. The device 500 may comprise a second waveguide WG2 for guiding TE-polarized light LB2 extracted from the first waveguide WG1. The first waveguide WG1 may be called e.g. as a lower waveguide, and the second waveguide WG2 may be called as an upper waveguide.

The polarizing device 500 may comprise a first coupling structure CR1 for polarization-selectively extracting TE-polarized light from the first waveguide WG1 to the second waveguide WG2. The first coupling structure CR1 may couple TE-polarized light in the vertical direction (+SZ) from the lower waveguide WG1 to the upper waveguide WG2. The second waveguide WG2 may comprise a tapered input portion TAP1. The tapered input portion TAP1 may overlap the first waveguide WG1. The first coupling structure CR1 may comprise the tapered input portion TAP1 and a portion of the first waveguide WG1 which is located beneath the tapered input portion TAP1.

The polarizing device 500 may comprise a first output portion OUT1 for providing TE-polarized light LB3. The polarizing device 500 may form the output light LB3 by coupling polarized light LB2 from the second waveguide WG2 to the first output portion OUT1. The polarizing device 500 may comprise the first waveguide WG1 and the first output portion OUT1 such that the first waveguide WG1 and the first output portion OUT1 are substantially at the same height level.

The device 500 may comprise a second coupling structure CR2 to couple TE polarized light LB2 from the second waveguide WG2 to the first output OUT1. The second coupling structure CR2 may couple TE-polarized light in the vertical direction (−SZ) from the upper waveguide WG2 to a waveguiding portion (e.g. WG3) of the first output OUT1.

The second waveguide WG2 may comprise a tapered output portion TAP2 to couple polarized light LB2 from the second waveguide WG2 to a waveguiding portion (e.g. WG3) of the first output OUT1. The coupling structure CR2 may comprise the tapered output portion TAP2 and the waveguiding portion (WG3) of the first output OUT1, which is located beneath the tapered output portion TAP2. An intermediate portion REG12 of the second waveguide WG2 may guide TE polarized light from the tapered input portion TAP1 to the tapered output portion TAP2.

The second coupling structure CR2 may be e.g. substantially similar to the first coupling structure CR1. The first coupling structure CR1 may couple TE mode from the lower waveguide WG1 to the upper waveguide WG2, and the second coupling structure CR2 may couple TE mode from the upper waveguide WG2 to the waveguiding portion (e.g. WG3) of the first output OUT1. Thus, the second coupling structure CR2 may operate in an inverse manner when compared with the operation of the first coupling structure CR1.

The first waveguide WG1 and the first output OUT1 may be formed e.g. on a substantially planar substrate SUB1 (FIG. 2) so that the first waveguide WG1 and the first output OUT1 are at the same height level with respect to a substrate SUB1.

The first output OUT1 may be implemented e.g. by using a third waveguide WG3, which is separate from the first waveguide WG1 (FIG. 1a). Alternatively, the first waveguide WG1 and the first output OUT1 may be portions of the same continuous material layer MAT1 (FIGS. 4a to 6b).

Figure 2:
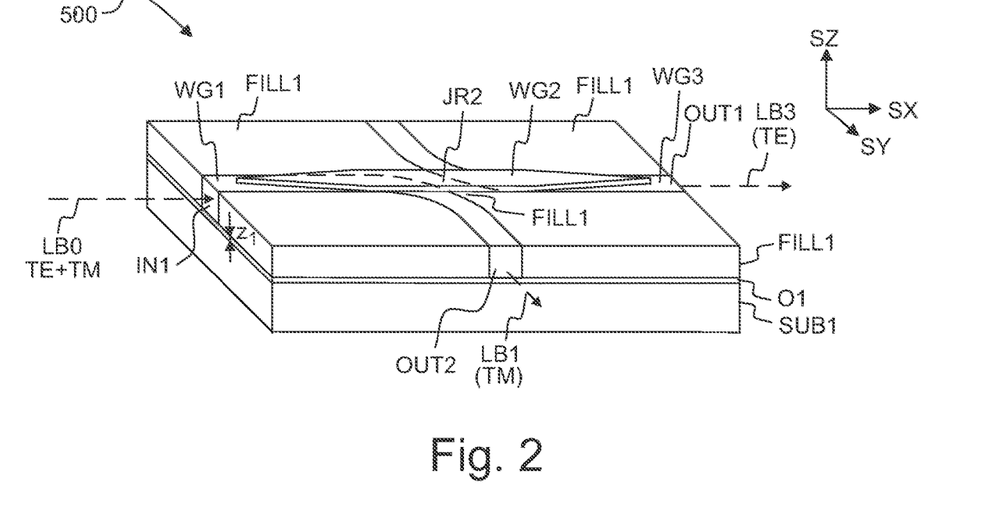
FIG. 2 shows, by way of example, in a three-dimensional view, a polarizing device implemented on a substrate, wherein a bridge region of the upper waveguide is supported by filler material.

The first output OUT1 may be implemented e.g. by providing a third waveguide WG3. The polarizing device 500 may comprise the first waveguide WG1 and a third waveguide WG3 such that the first waveguide WG1 and the third waveguide WG3 are substantially at the same height level. The waveguides WG1, WG3 may be formed e.g. on a substantially planar substrate SUB1, and the waveguides WG1, WG3 may be substantially at the same height level with respect to a substrate SUB1 (FIG. 2). The upper waveguide WG2 of the polarizing device may comprise a second tapered output portion TAP2 for coupling TE-polarized light from the upper waveguide to the third waveguide WG3. TE-polarized light propagating in the second waveguide WG2 may be coupled to provide TE polarized light propagating in the third waveguide WG3.

An output end of the first waveguide WG1 may be arranged to operate as a second output OUT2 for providing polarized output light LB1. The tapered portion TAP1 may remove TE polarized light from the input light LB0, wherein the residual part of the input light LB0 may be provided as TM-polarized output light LB1.

The first waveguide WG1 may provide TM polarized light LB1 by using the portion TAP1 to remove TE polarized light from the input light LB0, wherein the TM polarized component of the input light LB0 may remain confined in the first waveguide WG1 and may propagate to an output portion OUT2 of the first waveguide WG1. The first waveguide WG1 may comprise e.g. a bent portion BPOR1 to displace the polarized output light LB1 in a horizontal direction (e.g. in the direction SY or −SY) with respect to the second waveguide WG2.

The polarizing device 500 may split the input light LB0 into a first light beam (LB1) and into a second light beam (LB2, LB3). The first light beam (LB1) may be confined in the first waveguide WG1, and the second light beam may be confined in the second waveguide WG2. The first light beam (LB1) may propagate in the first waveguide WG1, and the second light beam may propagate in the second waveguide WG2.

The second waveguide WG2 may partly or completely overlap the first waveguide WG1. The second waveguide WG2 may be located on top of the first waveguide WG1. The first waveguide WG1 may be e.g. a lower waveguide and the second waveguide WG2 may be e.g. an upper waveguide.

The input light LB0 may comprise TE polarized light and/or TM polarized light. The input light LB0 may have predetermined, arbitrary, random and/or unknown polarization. In particular, the first waveguide WG1 may receive input light LB0, which comprises orthogonally polarized transverse electric (TE) mode and transverse magnetic mode (TM).

The polarizing device 500 may be arranged to provide output light (LB1, LB3) which has a predetermined polarization. The polarizing device 500 may be arranged to provide the output light (LB1, LB3) by extracting TE polarized light from the input light LB0. The polarizing device 500 may be arranged to operate e.g. as a polarization-selective filter.

The tapered form of the tapered input portion TAP1 may enable gradual coupling of the TE polarization to the upper waveguide. The tapered form of the tapered input portion TAP1 may adiabatically extract the TE mode from the first waveguide WG1.

The thickness $h_2$ (FIG. 3c) of the input portion TAP1 may be selected to be so small that the input portion TAP1 does not effectively confine TM-polarized light to propagate within the second waveguide WG2.

The refractive index $n_2$ of the material of the second waveguide WG2 may be higher than the refractive index $n_1$ of the material of the first waveguide WG1, so as to confine TE-polarized light to propagate in the second waveguide WG2. The refractive index $n_2$ of the tapered input portion TAP1 of the second waveguide WG2 may be higher than the refractive index $n_1$ of the first waveguide WG1. For example, the first waveguide WG1 may essentially consist of crystalline silicon (c-Si). For example, the second waveguide WG2 may essentially consist of amorphous silicon (a-Si).

Figure 3A:
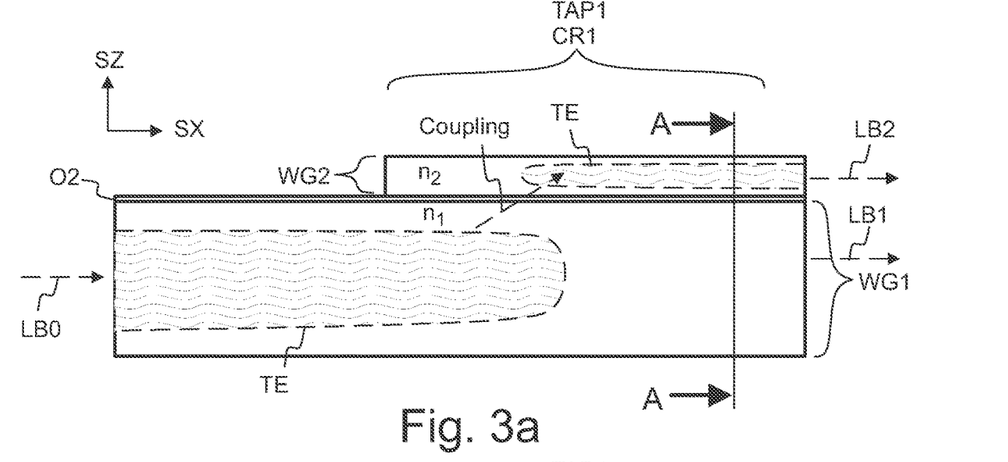
FIG. 3a shows, by way of example, in a cross-sectional side view, coupling of TE mode from a first lower waveguide to an upper waveguide.

The polarizing device 500 may optionally comprise a thin intermediate layer O2 between the tapered input portion TAP1 and the first waveguide WG1 (FIG. 3a). The intermediate layer O2 may be e.g. a silica layer. The intermediate layer O2 may facilitate producing the device 500 by lithographic techniques. The intermediate layer O2 may e.g. facilitate producing the polarizing device 500 by etching and/or deposition. The intermediate layer O2 may be e.g. a silica layer ($SiO_2$). The intermediate layer O2 may be used e.g. as an etching stop.

SX, SY, and SZ may denote orthogonal directions. The input portion TAP1 may be substantially parallel with the direction SX. The direction SZ may denote a vertical direction. The terms "upper" and "lower" may be defined with respect to the vertical direction SZ. The device 500 may comprise a substrate SUB1, wherein the lower waveguide WG1 may be located between the upper waveguide WG2 and the substrate SUB1. The direction SX may denote an "axial" direction or a "longitudinal" direction. The directions SY and −SY may denote a transverse direction with respect to the direction SX.

The intermediate layer O2 between the first waveguide WG1 and the input portion TAP1 may be substantially parallel with a plane defined by the directions SX and SY. The vertical direction SZ may be substantially perpendicular to the intermediate layer O2 between the first waveguide WG1 and the input portion TAP1.

The input light LB0 may propagate e.g. in the direction SX in the first waveguide WG1. The tapered input portion TAP1 may enable gradual coupling of the TE polarization to the second waveguide WG2. As an additional effect, the tapered form of the tapered input portion TAP1 may also reduce or avoid reflecting the input light backwards (e.g. in the direction −SX) in the first waveguide WG1 beneath the tapered input portion TAP1.

The dimensions of the second coupling structure CR2 may be selected to enable effective coupling of TE mode from the upper waveguide to the output portion OUT1. The dimensions of the second coupling structure CR2 may be similar to or different from the dimensions of the first coupling structure CR1. For example, the thickness of the tapered output portion TAP2 may be different from the thickness of the tapered input portion TAP1. For example, the taper ratio of the tapered output portion TAP2 may be different from the taper ratio of the tapered input portion TAP1.

Figure 1B:
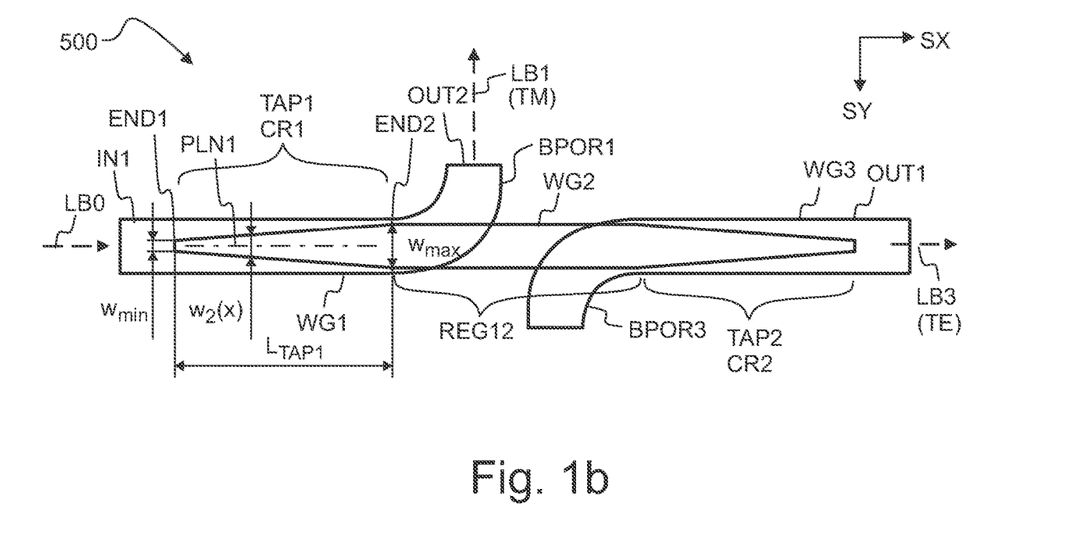
FIG. 1b shows, by way of example, in a top view, the polarizing device of FIG. 1a, FIG. 1c shows, by way of example, in a side view, the polarizing device of FIG. 1a, FIG. 1d shows, by way of example, in a side view, coupling of TE mode from a first lower waveguide to an upper waveguide, and from the upper waveguide to a second lower waveguide.

Referring to FIG. 1b, the taper ratio ($R_{TAP1}$) of the tapered input portion (TAP1) may be e.g. in the range of 1:10000 to 1:100. The range of 1:10000 to 1:100 may e.g. provide good polarization-selectivity with small physical size of the device.

A smaller taper ratio ($R_{TAP1}$) may mean increased length ($L_{TAP1}$) of the input portion TAP1, in a situation where the difference ($w_{max}-w_{min}$) of the input portion TAP1 remains constant.

The taper ratio ($R_{TAP1}$) of the tapered input portion (TAP1) may also be e.g. smaller than 1:10000, e.g. in order to provide high selectivity and/or in order to minimize optical losses.

The taper ratio ($R_{TAP1}$) of the tapered input portion (TAP1) may also be e.g. in the range of 1:100 to 1:10, e.g. in order to reduce the physical size of the device. The taper ratio ($R_{TAP1}$) of the tapered input portion (TAP1) may also be e.g. in the range of 1:100 to 1:10, e.g. in order to reduce the physical length of the device.

The taper ratio ($R_{TAP1}$) means the ratio of the difference ($w_{max}-w_{min}$) between the maximum width $w_{max}$ and the minimum width $w_{min}$ of the tapered portion to the length ($L_{TAP1}$) of the tapered portion TAP1.

For example, the dimensions $w_{min}$=0.5 µm, $w_{max}$=1.5 µm, $L_{TAP1}$=1000 µm may correspond to the taper ratio $R_{TAP1}$=1:1000.

The tapered portion TAP1 may have the width $w_{min}$ at a first end END1, and the tapered portion TAP1 may have the width $w_{max}$ at a second end END2. The second end END2 of the tapered portion TAP1 of the second waveguide WG2 may adjoin an intermediate portion REG12 of the second waveguide WG2.

The first end END1 may be an input end, and the second end may be an output end END2. The tapered portion TAP1 may have the width $w_{min}$ at the input end END1, and the tapered portion TAP1 may have the width $w_{max}$ at the output end END2.

The width $w_{min}$ of the input end END1 of the tapered portion TAP1 may be e.g. smaller than or equal to 80% of the maximum width $w_{max}$ of the tapered portion TAP1.

The width $w_{min}$ of the input end END1 of the tapered portion TAP1 may be e.g. smaller than or equal to 50% of the maximum width $w_{max}$ of the tapered portion TAP1.

The width $w_{min}$ of the input end END1 of the tapered portion TAP1 may be e.g. smaller than or equal to 30% of the maximum width $w_{max}$ of the tapered portion TAP1.

The width $w_{min}$ of the input end END1 of the tapered portion TAP1 may be greater than zero e.g. in order to facilitate producing of the tapered portion TAP1 and/or in order to reduce the length of the tapered portion TAP1.

The tapered input portion TAP1 may comprise a single continuous taper or the taper may be implemented in a stepped manner by multiple portions of different widths.

Figure 1C:
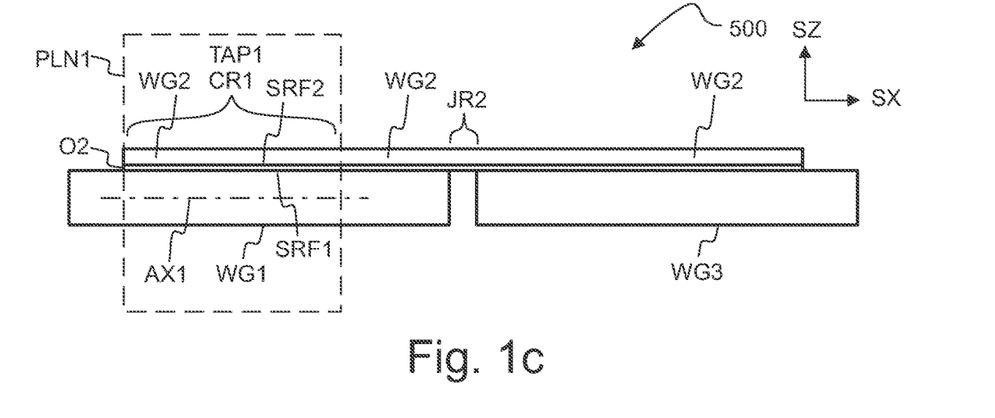

Referring to FIGS. 1b and 1c, the tapered input portion TAP1 may symmetrically overlap the first waveguide WG1. The tapered input portion TAP1 may be positioned symmetrically with respect to the first waveguide WG1, e.g. in order to maximize coupling efficiency for the TE mode and/or in order to effectively reject the TM mode. PLN1 may denote a (vertical) plane of symmetry. The first coupling structure CR1 may be substantially symmetric with respect to the symmetry plane PLN1. The plane PLN1 may be perpendicular to a bottom surface SRF2 of the tapered input portion TAP1, and the plane PLN1 may contain the centerline AX1 of the first waveguide WG1.

The centerline AX1 of the first waveguide WG1 may lie on the symmetry plane PLN1. The tapered input portion TAP1 may be symmetric with respect to the symmetry plane PLN1. The plane PLN1 may be perpendicular to an upper surface portion SRF1 of the first waveguide WG1. The upper surface portion SRF1 may face the bottom surface SRF2. The plane PLN1 may be perpendicular to the interface between the tapered portion TAP1 and the first waveguide WG1. The section of the first waveguide WG1 below the tapered portion TAP1 may be symmetric with respect to the symmetry plane PLN1.

The surfaces SRF1, SRF2 may be parallel with a plane defined by the directions SX and SY. The surfaces SRF1, SRF2 may be perpendicular to the direction SZ. The symmetry plane PLN1 may be defined by the directions SX and SZ.

The tapered input portion TAP1 may be substantially symmetric with respect to a symmetry plane PLN1, wherein the symmetry plane PLN1 is perpendicular to a bottom surface SRF2 of the tapered input portion TAP1, and wherein the symmetry plane PLN1 contains a centerline AX1 of the first waveguide WG1.

The symmetrically positioned tapered input portion (TAP1) may extract the TE mode from the lower waveguide (WG1) without converting TE polarized light into TM polarized light. The tapered input portion (TAP1) may overlap the first waveguide WG1 such that there is no lateral offset of the input portion (TAP1) with respect to the first waveguide WG1.

Figure 1D:
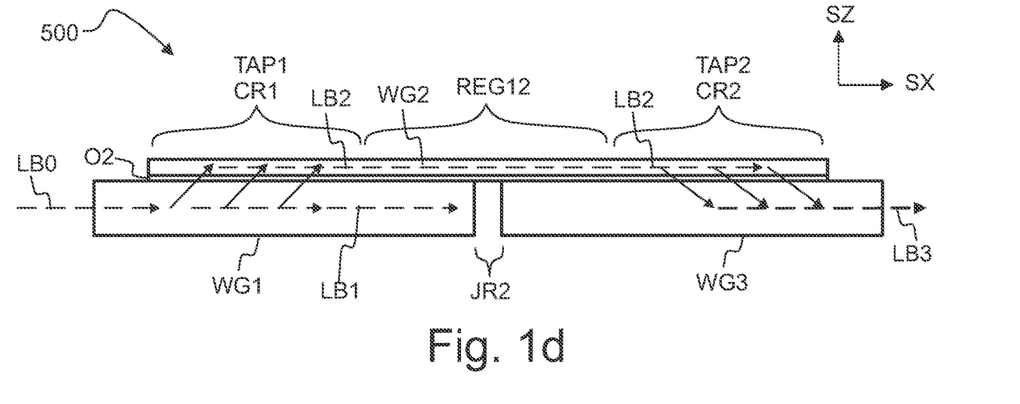

Referring to FIG. 1d, the polarizing device 500 may comprise the first waveguide WG1 for guiding input light LB0. The tapered input portion TAP1 may extract TE-polarized light from the first waveguide WG1. The remaining TM-polarized part of the input light LB0 may constitute the output light LB1.

The second waveguide WG2 may guide TE-polarized light LB2 extracted from the first waveguide WG1. The polarizing device 500 may comprise a second coupling structure CR2 for coupling the polarized light from the second waveguide WG2 to a waveguiding portion (WG3) of the first output OUT1.

Referring to FIG. 2, the polarizing device 500 may be implemented on a substrate SUB1. The substrate SUB1 may comprise e.g. silicon (Si) and/or silica ($SiO_2$). The first waveguide WG1 may be formed e.g. on top of an intermediate layer O1. The intermediate layer may be e.g. a silica layer ($SiO_2$). The intermediate layer O1 may be e.g. a buried oxide layer.

The polarizing device 500 may be fabricated e.g. by using silicon-on-insulator technology. The polarizing device 500 may be fabricated e.g. by silicon-on-insulator technology and/or by using complementary metal oxide semiconductor technology.

The device 500 may optionally comprise one or more portions filled with filling material FILL1. In particular, a space beneath the second waveguide WG2 between the first waveguide WG1 and the third waveguide WG3 may be filled with filling material FILL1. The filling material FILL1 may at least partly support the second waveguide WG2.

The input IN1 may be at a height $z_1$ with respect to the substrate SUB1. The input IN1 and the outputs OUT1, OUT2 may be substantially at the same height $z_1$. The height $z_1$ may refer e.g. to the vertical position of the bottom side of the input IN1.

Figure 3B:
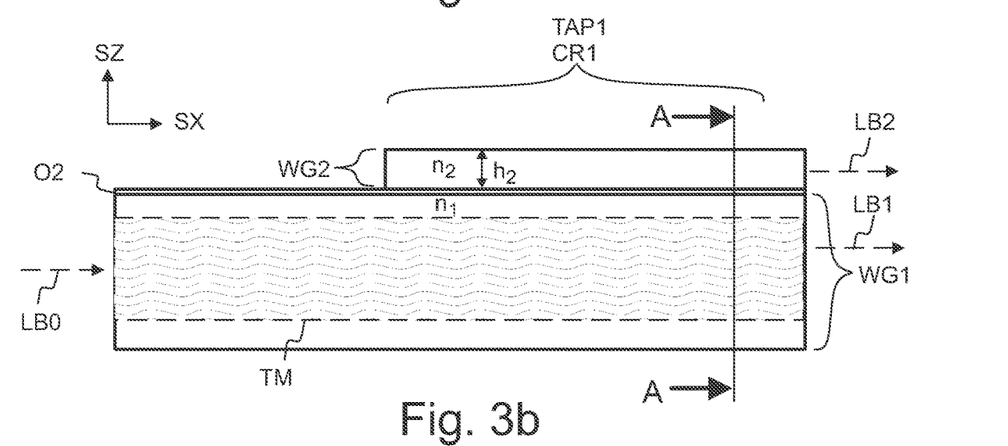
FIG. 3b shows, by way of example, in a cross-sectional side view, TM mode confined within the lower waveguide of FIG. 3a, FIG. 3c shows, by way of example, in a cross-sectional end view, the position of the tapered portion of the upper waveguide with respect to the lower waveguide.
Figure 3C:
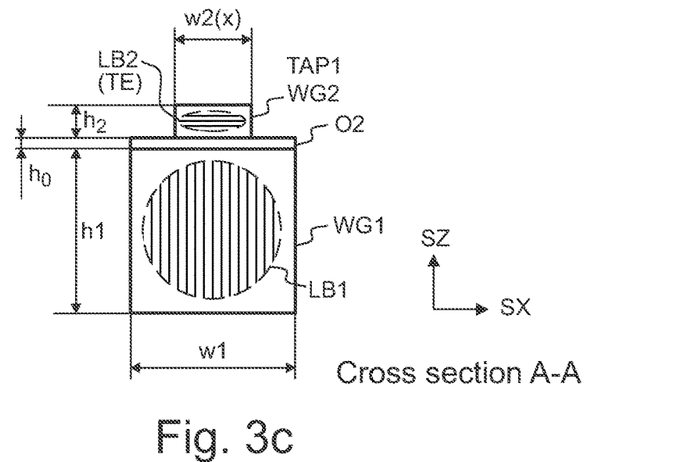

Referring to FIGS. 3a, 3b, 3c, the input portion TAP1 of the second upper waveguide WG2 may overlap the first lower waveguide WG1. The first lower waveguide WG1 may guide input light LB1, which may comprise a TE polarized component and a TM polarized component.

The refractive index $n_2$ of the core material of the second waveguide WG2 may be higher than the refractive index $n_1$ of core material of the first waveguide WG1.

The effective refractive index $n_{2,TE0}$ of the second waveguide WG2 for the TE0 mode may be higher than the effective refractive index $n_{2,TM0}$ of the second waveguide WG2 for the TM0 mode.

The effective refractive index $n_{2,TE0}$ of the second waveguide WG2 for the TE0 mode may be higher than the effective refractive index $n_{1,TE0}$ of the first waveguide WG1 for the TE0 mode.

The effective refractive index $n_{2,TM0}$ of the second waveguide WG2 for the TM0 mode may even be lower than the effective refractive index $n_{1,TM0}$ of the first waveguide WG1 for the TM0 mode.

To the first approximation, the refractive index difference ($n_{2,TE0}-n_{1,TE0}$) may be understood to provide total internal reflection for TE polarized light, which propagates in the upper waveguide WG2. This refractive index difference may cause that TE polarized light may be effectively coupled from the first waveguide WG1 to the second waveguide WG2. This refractive index difference may cause that TE polarized light propagating in the second waveguide WG2 may remain confined within the second waveguide WG2. The refractive index difference may prevent the TE polarized light from escaping from the second waveguide WG2 back to the first waveguide WG1.

Referring to FIG. 3b, the thickness $h_2$ of the input portion TAP1 of the second upper waveguide WG2 may be so small that the second waveguide WG2 does not confine TM polarized light to propagate within the second waveguide WG2.

The refractive index difference ($n_{2,TM0}-n_{1,TM0}$) between the effective refractive index $n_{2,TM0}$ of the second waveguide WG2 for the TM0 mode and the effective refractive index $n_{1,TM0}$ of the first waveguide WG1 may even be negative so as to prevent coupling of the TM mode from the first waveguide WG1 to the second waveguide WG2. TM-polarized light which would escape from the lower waveguide WG1 to the upper waveguide WG2 would return back to the lower waveguide WG1. Consequently, the TM polarized component of the input light LB0 may remain confined within the first waveguide WG1. The TM polarized light may propagate within the first waveguide WG1. The small thickness $h_2$ of input portion TAP1 of the upper waveguide WG2 may cause that an effective refractive index $n_{2,TM0}$ of the upper waveguide WG2 for the TM0 mode is lower than an effective refractive index $n_{2,TE0}$ of the upper waveguide WG2 for the TE mode. The thickness $h_2$ of the input portion TAP1 may be selected so as to prevent coupling of the TM mode from the first waveguide WG1 to the second waveguide WG2, wherein said thickness $h_2$ may enable effective coupling of the TE mode from the first waveguide WG1 to the second waveguide WG2

Using the input portion TAP1 to extract TE polarized light from the first waveguide WG1 may provide a first TM polarized light beam LB1 propagating in the first lower waveguide WG1, and a second TE polarized light beam LB2 propagating in the upper waveguide WG2. The first TM polarized light beam LB1 may be spatially separate from the second TE polarized light beam LB2.

The TM polarized light may be provided as output light LB1 from the first waveguide WG1, if needed.

In an embodiment, the device 500 may also comprise a beam dump to attenuate or eliminate the light LB1 or LB2, if needed.

FIG. 3c shows the transverse position of the tapered input portion TAP1 with respect to the first waveguide WG1.

The transverse dimensions $w_1$, $h_1$ of the first waveguide WG1 may be selected to enable at least single mode propagation of the TE0 mode and TM0 mode of the input light LB0.

The transverse dimensions $w_1$, $h_1$ of the first waveguide WG1 may also be selected to enable multimode operation. In that case the input light LB0 may be guided to the polarizing device e.g. via a mode cleaner in order to eliminate unwanted modes.

The width $w_1$ of the first waveguide WG1 may be e.g. in the range of 2 μm to 15 μm, and the height $h_1$ of the first waveguide WG1 may be e.g. in the range of 2 μm to 15 μm. The width $w_1$ and the height h1 may mean the transverse dimensions of the waveguiding core of the first waveguide WG1. Selecting a larger transverse dimension $w_1$ and/or $h_1$ may facilitate coupling of input light LB0 into the polarizing device. On the other hand, selecting a smaller transverse dimension $w_1$ and/or $h_1$ may force the input light LB0 to more effectively interact with the tapered input portion TAP1.

The first waveguide WG1 may have e.g. a substantially rectangular cross-section. For example, the dimension $w_1$ may be substantially equal to 3 μm, and the dimension $h_1$ may be substantially equal to 3 μm. For example, the dimension $w_1$ may be substantially equal to 5 μm, and the dimension $h_1$ may be substantially equal to 5 μm. For example, the dimension $w_1$ may be substantially equal to 12 μm, and the dimension $h_1$ may be substantially equal to 12 μm.

The first waveguide WG1 may have a substantially planar upper surface, so as to provide optimum coupling efficiency for the TE polarized light.

The coordinate x may indicate a position in the direction SX. The tapered input portion TAP1 may have a thickness $h_2$. The thickness $h_2$ may be e.g. in the range of 0.1 μm to 1 µm. The thickness $h_2$ may be e.g. substantially equal to 0.6 µm. The tapered input portion TAP1 may have a width $w_2(x)$ at a position x. The width $w_2(x)$ may have the minimum value $w_{min}$ at the input end END1 of the tapered input portion TAP1, and the width $w_2(x)$ may have the maximum value $w_{max}$ at the output end END2 of the tapered input portion TAP1.

The maximum value ($w_{max}$) of the width $w_2(x)$ of the tapered portion TAP1 may be selected to enable propagation of the confined TE mode within the tapered portion TAP1.

The maximum value ($w_{max}$) of the width $w_2(x)$ of the tapered portion TAP1 may be e.g. in the range of 20% to 100% of the width w1 of the first waveguide WG1.

The maximum value ($w_{max}$) of the width $w_2(x)$ of the tapered portion TAP1 may be e.g. substantially equal 1.5 µm, e.g. in a situation where the width $w_1$ of the first waveguide WG1 is substantially equal to 3 µm.

Optionally, also the minimum value ($w_{min}$) of the width $w_2(x)$ of the tapered portion TAP1 may be selected to enable propagation of the confined TE mode within the tapered portion TAP1, in a region which is close to the input end END1 of the tapered portion TAP1. Propagation of the confined TE mode close to the input end END1 may e.g. allow reducing the length ($L_{TAP1}$) of the tapered portion TAP1.

The device 500 may optionally comprise the intermediate layer O2 between the first waveguide WG1 and the second waveguide WG2. The thickness $h_O$ of the intermediate layer O2 may be e.g. smaller than 0.1 µm. The thickness $h_O$ of the intermediate layer O2 may be e.g. substantially equal to 0.04 µm.

The lower first waveguide may be e.g. crystalline silicon waveguide, and the upper second waveguide may be e.g. an amorphous silicon waveguide. A thin silica layer may be optionally disposed between the lower waveguide and the upper tapered input portion. The thin silica ($SiO_2$) layer may facilitate manufacturing of the waveguiding layers of the device.

The polarizing device 500 may comprise a third waveguide WG3, wherein the second coupling structure CR2 may be arranged to couple TE-polarized light from the second waveguide WG2 to third waveguide WG3. The second waveguide WG2 may comprise an intermediate bridge region JR2, which is not supported from below by the combination of the first waveguide WG1 and the third waveguide WG3. The bridge region JR2 may also be called e.g. as a jumper region. The bridge region JR2 is shown in FIGS. 1a to 1d.

The bridge region JR2 may be optionally supported by filling material FILL1, e.g. as shown in FIG. 2. The polarizing device 500 may comprise filling material FILL1, which may be arranged to mechanically support the bridge region JR2 from below. Certain manufacturing processes may require that all empty spaces beneath the upper waveguide WG2 must be completely filled with one or more structural materials (e.g. FILL1) before the upper waveguide WG2 can be deposited on top of the underlying structures.

However depositing filling material FILL1 to support the bridge region JR2 may require an additional manufacturing step. The bridge region JR2 may e.g. slow down the production rate of the polarizing devices 500.

The need to deposit filling material FILL1 beneath the bridge region JR2 may be avoided e.g. by using the same continuous waveguiding material layer MAT1 to mechanically support the entire length of the second waveguide WG2.

A first waveguiding portion (WG1, IN1), an intermediate portion (INTER1, CR12, REG1), and an output portion (FG3, OUT1) of the same waveguiding material layer MAT1 may together support the entire length of the second waveguide WG2.

The intermediate portion of the waveguiding material layer MAT1 may also be arranged to provide transverse coupling of TM polarized light to a second output portion (OUT2), away from the first output portion (OUT1). The intermediate portion of the waveguiding material layer MAT1 may be arranged to operate as a part of a transverse coupling region CR12. The intermediate portion may support the upper waveguide WG2 from below, together with the first waveguide WG1 and with a waveguiding output portion OUT1. The intermediate portion, the first waveguide WG1 and the waveguiding output portion OUT1 may be portions of the same continuous waveguiding material layer MAT1. Thus, the same continuous waveguiding material layer MAT1 may mechanically support the entire length of the second waveguide WG2.

The polarizing device 500 may comprise the transverse coupling region CR12 to horizontally separate the TM polarized light propagating in the lower waveguide WG1 from the TE polarized light propagating in the upper waveguide WG2. Consequently, the tapered input portion TAP1 may couple the TE mode from the first waveguide WG1 to the upper waveguide WG2, and the tapered output portion TAP2 may couple the TE mode from the upper waveguide to the first output OUT1, wherein the transverse coupling region CR12 may couple the TM mode from the first waveguide WG1 to the second output OUT2, and wherein the transverse coupling region CR12 may substantially prevent coupling of the TM mode from the first waveguide WG1 to the first output OUT1.

The first waveguide WG1, the intermediate portion of the layer MAT1, and the first output OUT1 may be portions of the same continuous waveguiding layer MAT1. This may facilitate manufacturing of the polarizing device because there is no need to use additional filler material between the substrate and the upper waveguide in order to support a bridge portion the upper waveguide. The material layer MAT1 may be substantially homogeneous.

Supporting the entire length of the upper waveguide with the same material layer may facilitate producing the polarizing device. Supporting the entire length of the upper waveguide with the same material layer may improve mechanical stability of the polarizing device. Supporting the entire length of the upper waveguide with the same material layer may improve the capability of the polarizing device to withstand mechanical shocks and/or to withstand changes of operating temperature.

The device 500 may optionally comprise the thin intermediate layer O2 between the material layer MAT1 and the upper waveguide WG2 (FIG. 3c). The waveguiding material layer MAT1 may support the entire length of the upper waveguide WG2 directly or via the intermediate layer O2. The continuous material layer MAT1 may support each point of the upper waveguide WG2 from below via the intermediate layer O2. The entire lower surface of the upper waveguide WG2 may be in contact with the intermediate layer O2, and the entire lower surface of the intermediate layer O2 may be in contact with the material layer MAT1. The intermediate layer O2 may be disposed on top of the waveguiding layer MAT1, and the upper waveguide WG2 may be disposed on the intermediate layer O2. The waveguiding layer MAT1 may support the entire length of the upper waveguide WG2 directly or via the intermediate layer O2. The waveguiding layer MAT1 may support the entire length of the upper waveguide WG2 such that the intermediate layer O2 is located between the waveguiding layer MAT1 and the upper waveguide WG2. The thickness ($h_O$) of the intermediate layer O2 may be selected such that the intermediate layer O2 does not operate as a waveguiding layer. The thickness ($h_O$) of the intermediate layer O2 may be selected such that the intermediate layer O2 does not support TE and/or TM modes propagating within the intermediate layer O2.

FIGS. 4a to 6b show examples where the same material layer MAT1 supports the upper waveguide WG2 from below. The material layer MAT1 may support the upper waveguide WG2 directly or via the intermediate layer O2.

Figure 4B:
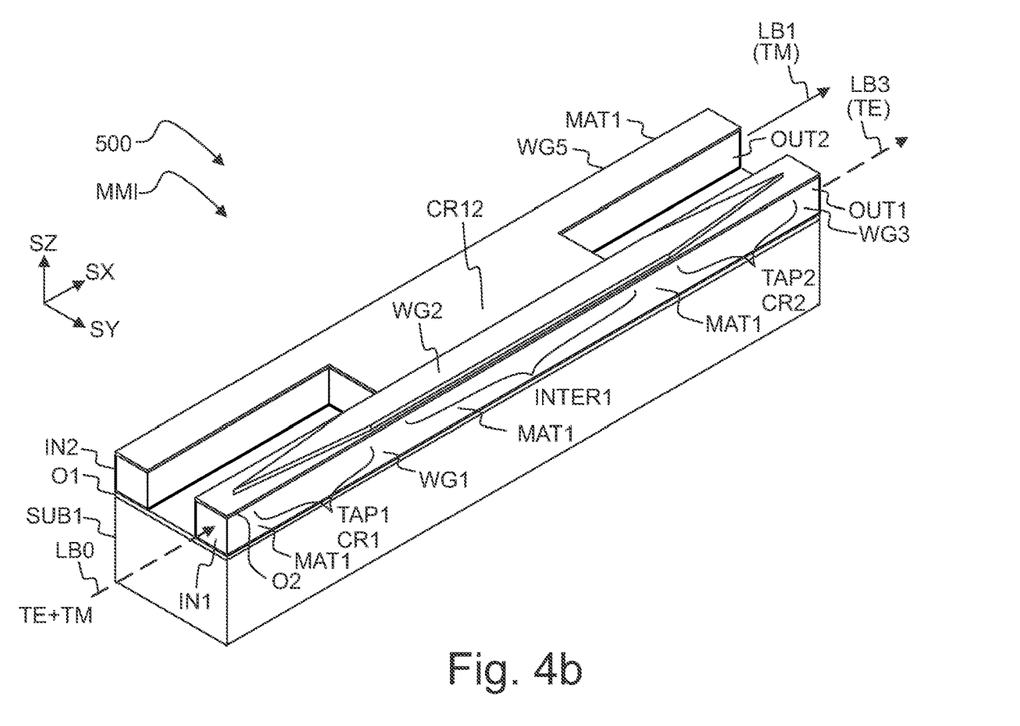
FIG. 4b shows, by way of example, in a three-dimensional view, a polarizing device, which comprises a multi-mode interference coupler.

Referring to FIGS. 4a and 4b, the polarizing device 500 may comprise a 2×2 multimode interferometer MMI. The 2×2 multimode interferometer MMI may comprise a first input arm IN1, a second input arm IN2, a first output arm OUT1, a second output arm OUT2, and a multimode portion CR12 to couple each input arm IN1, IN2 to each output arm OUT1, OUT2. Each arm (IN1, IN2, OUT1, OUT2) may be implemented by a portion of a waveguide.

In particular, the first input arm IN1, the first output arm OUT1, the multimode portion CR12, the first output arm OUT1, and the second output arm OUT2 may be portions of the same waveguiding material layer MAT1. The multimode portion CR12 may be a planar waveguiding portion, which couples each arm to the other arms.

The width $w_{CR12}$ and the length $L_{CR12}$ of the multimode portion CR12 may be selected to couple the TM mode from the first waveguide WG1 to the second output arm OUT2.

The polarizing device 500 may comprise a first upper waveguide WG2. The upper waveguide WG2 may have a tapered input portion TAP1 to extract TE polarized light from the first input arm IN1. The upper waveguide WG2 may have a tapered output portion TAP2 to couple the TE polarized light from the upper waveguide WG2 to the first output arm OUT1.

The multimode portion CR12 of the 2×2 multimode interferometer MMI may be arranged to couple the TM polarized light in a transverse horizontal direction (-SY) from the first input arm IN1 to the second output arm OUT2. The dimensions of the multimode portion CR12 may be selected to couple the TM polarized light from the first input arm IN1 to the second output arm OUT2. The dimensions of the multimode portion CR12 may be selected to substantially prevent coupling the TM polarized light from the first input arm IN1 to the first output arm OUT1. The multimode portion CR12 may have a width $w_{CR12}$ The first input arm IN1, the multimode portion CR12, and the first output arm OUT1 may together support the entire length of the upper waveguide WG2 from below. An input portion IN1, an intermediate portion INTER1, and an output portion OUT1 of the same waveguiding material layer MAT1 may together support the entire length of the upper waveguide WG2 from below. Thus, the polarizing device of FIG. 4a or 4b may be implemented without using a filling material (FILL1) to support the upper waveguide WG2 from below. The polarizing device may optionally comprise an intermediate layer O2 between the material layer MAT1 and the upper waveguide WG2.

The polarizing device 500 may optionally comprise a second upper waveguide WG4 (FIG. 4a). The structure of the second upper waveguide WG4 may be similar to the first upper waveguide WG2, e.g. to provide a symmetrical device 500. The symmetry may e.g. facilitate using one or more polarizing devices 500 as parts of a photonic integrated circuit.

The polarizing device 500 may be optionally implemented on a substrate SUB1 (FIG. 4b). The inputs IN1, IN2 and the outputs OUT1, OUT2 may be substantially at the same height ($z_1$) with respect to the substrate SUB1.

Figure 5B:
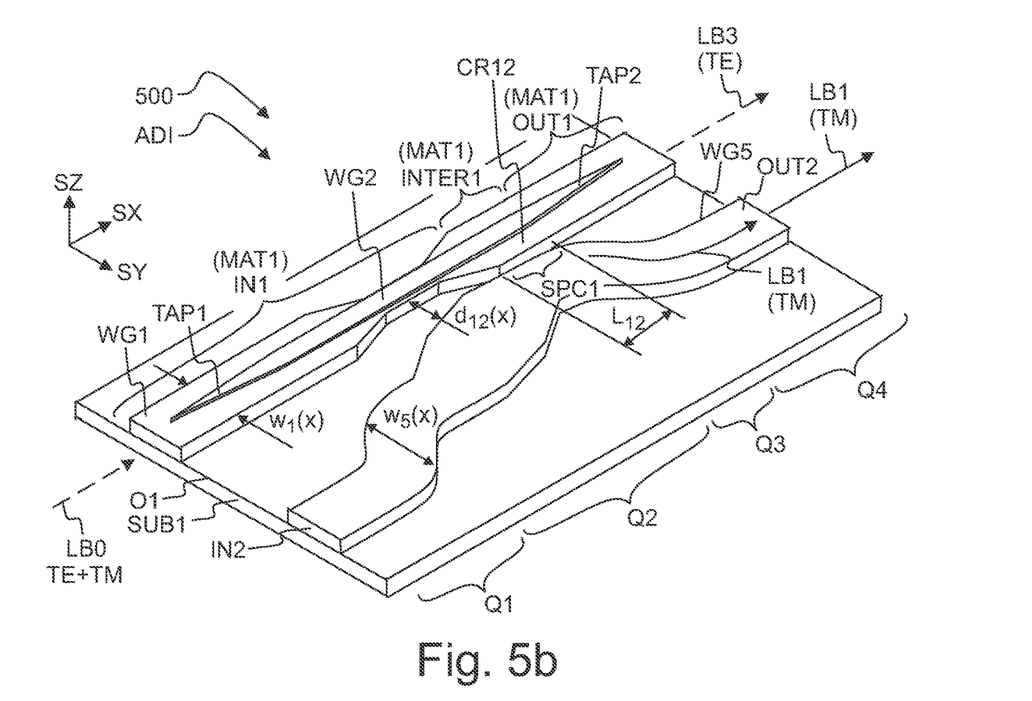
FIG. 5b shows, by way of example, in a three-dimensional view, the polarizing device of FIG. 5a, FIG. 6a shows, by way of example, in a three-dimensional view, a polarizing device, which comprises a transverse coupling region and collecting optics.

Referring to FIGS. 5a and 5b, the polarizing device 500 may comprise a directional coupler ADI. The directional coupler ADI may comprise a first lower waveguide WG1, and a second lower waveguide WG5. The second lower waveguide WG5 may be separated from the first lower waveguide WG1 by a gap or a spacer SPC1. The directional coupler ADI may be arranged to couple TM polarized light from the first lower waveguide WG1 via the gap or spacer SPC1 to the second lower waveguide WG5. The directional coupler ADI may be arranged to couple TM polarized light away from the first lower waveguide WG1 to the second lower waveguide WG5 by evanescent coupling via the gap or spacer SPC1.

The polarizing device 500 may comprise the first lower waveguide WG1, an upper waveguide WG2, and the second lower waveguide WG5. The upper waveguide WG2 may have a tapered input portion TAP1 to extract TE polarized light from the first lower waveguide WG1, and the upper waveguide WG2 may have a tapered output portion TAP2 to couple the TE polarized light from the upper waveguide WG2 to the first output OUT1.

The polarizing device 500 may comprise the directional coupler ADI wherein the second waveguide WG2 may be implemented on top of the first lower waveguide WG1. The first lower waveguide WG1 may support the entire second waveguide WG2 from below. A continuous waveguiding material layer MAT1 of the first lower waveguide WG1 may support the entire second waveguide WG2 directly or via an intermediate layer O2. An input portion IN1, an intermediate portion INTER1, and an output portion OUT1 may together support the entire second waveguide WG2.

The first lower waveguide WG1 may comprise a first input portion IN, an intermediate portion INTER1, and a first output portion OUT1. The second lower waveguide WG5 may comprise a second input portion IN2 and a second output portion OUT2. The intermediate portion INTER1 may operate as a transverse coupling region CR12, to couple TM mode in the transverse direction (SY) from the first lower waveguide WG1 via the gap or spacer SPC1 to the second lower waveguide WG5.

The directional coupler ADI may be arranged to couple TM polarized light from the first lower waveguide WG1 to the second output portion OUT2 of the second lower waveguide WG5, i.e. away from the first output portion OUT1.

The second input portion IN2 and the second output portion OUT2 may be portions of the second lower waveguide WG5. The waveguide WG5 may be separate from the continuous material layer MAT1, which supports the upper waveguide WG2.

In particular, the directional coupler ADI may be an adiabatic directional coupler. The dimensions of the waveguides (WG1, WG5) and the dimensions of the gap or spacer (SPC1) of the adiabatic directional coupler ADI may be selected such that the TM polarized light field stays in the fundamental mode at all times.

The TM-polarized light field may be coupled from the first lower waveguide WG1 to the second lower waveguide WG5 by evanescent adiabatic coupling such that the light field stays in the fundamental mode (TM00) at all longitudinal positions (x) of the transverse coupling region (CR12).

The adiabatic directional coupler may remove TM polarized light from the first waveguide WG1 so that the optical power of TM polarized light at the first output OUT1 of the first waveguide may be low or zero. For example, the adiabatic directional coupler may be arranged to operate such that the optical power of TM polarized light at the first output OUT1 may be e.g. smaller than 5% of the optical power of TM polarized light at the second output OUT2.

The adiabatic directional coupler ADI may comprise zones Q2, Q3, Q4, which may be called e.g. as a convergence zone Q2, an interaction zone Q3, and a divergence zone Q4. The convergence zone Q2 may comprise one or more curved waveguiding portions to bring the waveguides WG1, WG5 close to each other. Optical power may be coupled from the first lower waveguide WG1 via the gap or spacer SPC1 to the second lower waveguide WG5 in the interaction zone Q3. The divergence zone Q4 may comprise one or more curved waveguiding portions to separate the waveguides WG1, WG5 from each other.

The distance ($d_{12}$) between the waveguides WG1, WG5 may decrease with increasing longitudinal position coordinate (x) in the convergence zone Q2. The distance ($d_{12}$) between the waveguides WG1, WG5 may increase with increasing longitudinal position coordinate (x) in the divergence zone Q4. The interaction zone Q3 may have a length $L_{12}$ in the direction SX. The longitudinal distance between the convergence zone Q2 and the divergence zone Q4 may be equal to the length $L_{12}$ of the interaction zone Q3. The interaction zone Q3 may comprise the transverse coupling region CR12.

The width ($d_{12}$) and a length ($L_{12}$) of the gap SPC1 (or spacer), the width ($w_1$) of the first lower waveguide WG1, and the width ($w_5$) of the second lower waveguide WG5 may be selected to enable coupling of e.g. more than 95% of the optical power of the TM polarized light from the first waveguide WG1 to the second output portion OUT2. The dimensions of the adiabatic coupler may be selected to substantially prevent coupling the TM polarized light from the first waveguide WG1 to the first output OUT1.

The width $w_1$ of the first lower waveguide WG1 may be a function $w_1(X)$ of the axial position x (in the direction SX). The width $w_5$ of the second lower waveguide WG5 may be a function $w_5(x)$ of the axial position x. The width $d_{12}$ of the gap SPC1 between the waveguides WG1, WG5 may be a function $d_{12}(x)$ of the axial position x.

The adiabatic directional coupler ADI may optionally comprise a ore-conditioning zone Q1. The transverse dimensions of the waveguides WG1, WG2 in the pre-conditioning zone Q1 may be selected to optimize mode field distribution(s) for the next zone Q2. The tapered input portion TAP1 may be located in the pre-conditioning zone Q1 and/or in the convergence zone Q2.

Figure 6B:
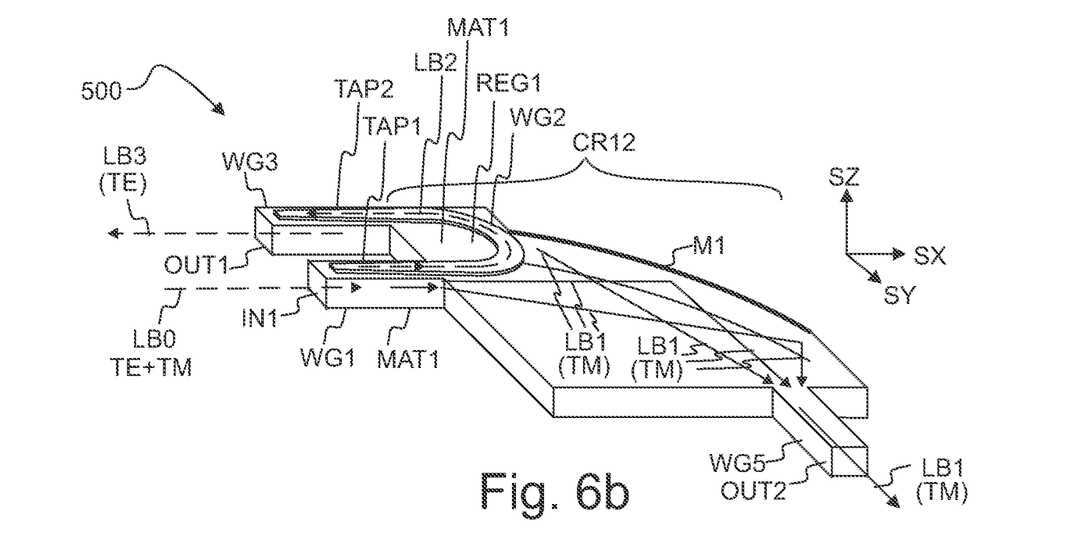
FIG. 6b shows, by way of example, in a three-dimensional view, the polarizing device of FIG. 6a, FIG. 7 shows, by way of example, the spectral position of input light, the spectral linewidth of input light, and an operating spectral range of the polarizing device.

Referring to FIGS. 6a and 6b, the polarizing device 500 may comprise a transverse coupling region CR12, which comprises an expansion region REG1 and collecting optics M1. The expansion region REG1 may provide diverging TM-polarized light LB1 from TM-polarized light LB1 received from the first waveguide WG1. The collecting optics M1 may collect the diverging TM-polarized light LB1 to the second output portion OUT2. The collecting optics M1 may concentrate the diverging TM-polarized light LB1 to the second output portion OUT2. The collecting optics M1 may focus the diverging TM-polarized light LB1 to the second output portion OUT2.

The transverse coupling region CR12 may horizontally separate the TM polarized light from the TE-polarized light, which propagates in the upper waveguide WG2.

The dimensions of the expansion region REG1 and the collecting optics M1 may be selected to substantially prevent coupling the TM polarized light from the first waveguide WG1 to the first output portion OUT1.

The upper waveguide WG2 may have a tapered input portion TAP1 to extract TE polarized light from the first waveguide WG1, and the upper waveguide WG2 may have a tapered output portion TAP2 to couple the TE polarized light from the upper waveguide WG2 to the first output portion OUT1.

The first waveguide WG1, the expansion region REG1 and the first output portion OUT1 may together support the entire length of the second waveguide WG2. The upper waveguide WG2 may have a curved intermediate portion INTER2, which may be supported by the expansion region REG1 from below. The expansion region REG1 may support a curved intermediate portion INTER2 of the second waveguide WG2.

The expansion region REG1 may be a substantially planar waveguiding portion. The first waveguide WG1, the expansion region REG1, and the first output portion OUT1 may be portions of the same continuous waveguiding material layer MAT1. The second output portion OUT2 may also be a portion of said material layer MAT1. The waveguiding layer MAT1 may comprise the first waveguide WG1, the expansion region REG1, and the output portions OUT1, OUT2.

The collecting optics M1 may comprise e.g. a focusing reflector. The collecting optics M1 may be a focusing reflector. The orientation of the reflector M1 and the position of the output OUT2 may be selected such that the reflector M1 may operate by total internal reflection (TIR). The reflector M1 may be formed e.g. by etching.

In general, the polarizing device 500 may be used e.g. as a part of a photonic integrated circuit. The polarizing device 500 may be used e.g. as a part of a telecommunication system, as a part of an optical measuring apparatus, and/or as a part of a light source. The polarizing device 500 may be used e.g. in an optical transmitter or in an optical receiver configured to handle polarization-division-multiplexed (PDM) communication signals. The polarizing device 500 may be used e.g. as a polarizing beam splitter or as a beam combiner.

The coupling structures CR1, CR2 of FIGS. 4a to 6b may be implemented e.g. as described with reference to FIGS. 1a to 3c. The coupling structures CR1, CR2 of FIGS. 4a to 6b may be arranged to operate e.g. as described with reference to FIGS. 1a to 3c.

The input IN1 and the outputs OUT1, OUT2 may be e.g. at the same height. The devices 500 of FIGS. 4a to 6b may be optionally implemented on a substrate SUB1. The devices 500 may be implemented such that the input IN1 and the outputs OUT1, OUT2 are at the same height ($z_1$) with respect to the substrate SUB1.

Figure 7:
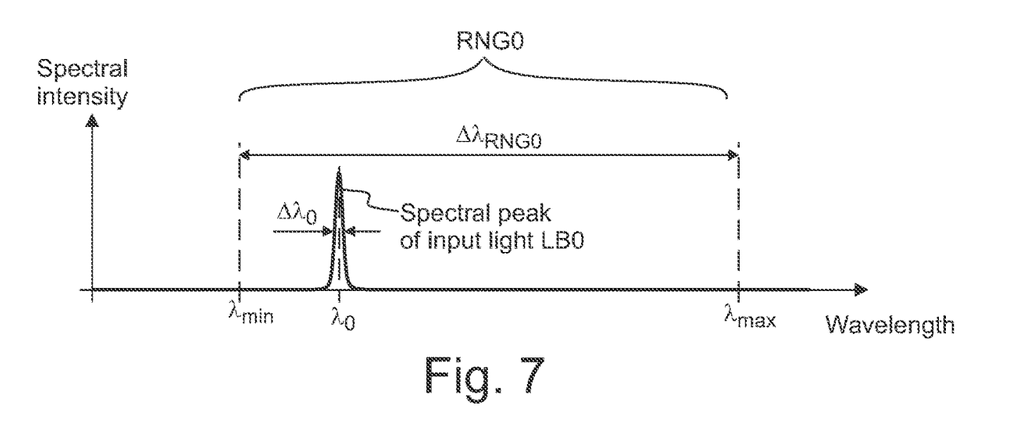

FIG. 7 shows, by way of example, a spectral position Xo of input light LB0, a spectral linewidth $\Delta\lambda_0$ of the input light LB0, and spectral operating range RNG0. The spectral operating range RNG0 of the polarizing device 500 may have a minimum wavelength $\lambda_{min}$ and a maximum wavelength $\lambda_{max}$. The polarizing device 500 may have a wide spectral operating range RNG0. For example, the operating range RNG0 may comprise at least the spectral range from 1.4 µm to 1.8 µm.

The polarizing device 500 may form polarized light (LB1, LB2, LB3) from received input light LB0 e.g. in a situation where the wavelength ($\lambda_0$) of the input light LB0 is in the spectral operating range RNG0.

The wavelength $\lambda_0$ of the input light LB0 may be e.g. in the range of 1.4 to 1.8 µm. The wavelength $\lambda_0$ of the input light LB0 may be e.g. substantially equal to 1.55 µm. The wavelength $\lambda_0$ of the input light LB0 may be e.g. in the C band, i.e. in the range of 1.530 µm to 1.565 µm.

The polarizing device 500 may also form polarized light (LB1, LB2, LB3) from received input light LB0 e.g. in a situation where the wavelength ($\lambda_0$) of the input light LB0 varies between the minimum wavelength $\lambda_{min}$ and the maximum wavelength $\lambda_{max}$ of the spectral operating range RNG0.

The polarizing device 500 may also receive e.g. multiple spectral components at different wavelengths, in a situation where the multiple spectral components are in the spectral operating range RNG0.

TE polarized means that the main component of the electric field of the electromagnetic radiation is perpendicular to the direction of propagation and parallel with the interface between the first waveguide WG1 and the input portion TAP1. TM polarized means that the main component of the electric field of the electromagnetic radiation is perpendicular to the direction of propagation and perpendicular with the interface between the first waveguide WG1 and the input portion TAP1. TE polarized light may also be called as "s"-polarized light. TM polarized light may also be called as "p"-polarized light. The TE polarized light may refer to TE0 mode of electromagnetic radiation propagating in a waveguide. The TM polarized light may refer to TM0 mode of electromagnetic radiation propagating in a waveguide.

The polarizing device 500 may simultaneously provide good coupling efficiency (e.g. ≥95%) and good polarization-selectivity.

The symbol $P_{0,TE}$ may denote the optical power of the TE0 mode of the input light LB0.

The symbol $P_{0,TM}$ may denote the optical power of the TM0 mode of the input light LB0.

The symbol $P_{WG1,TE}$ may denote the optical power of the TE0 mode of the light LB1 provided from the first waveguide WG1. The power $P_{WG1,TE}$ may be greater than zero e.g. due to less than 100% coupling efficiency of TE mode from the first waveguide WG1 to the second waveguide WG2.

The symbol $P_{WG1,TM}$ may denote the optical power of the TM0 mode of the light LB1 provided from the first waveguide WG1.

The symbol $P_{WG2,TE}$ may denote the optical power of the TE0 mode of the light LB2 provided from the second waveguide WG2.

The symbol $P_{WG2,TM}$ may denote the optical power of the TM0 mode of the light LB2 provided from the second waveguide WG2. The power $P_{WG2,TM}$ may be greater than zero due to (unwanted) leakage of TM mode from the first waveguide WG1 to the second waveguide WG2.

A first transmittance value $T_{WG1,TE}$ is equal to the ratio ($P_{WG1,TE}/P_{0,TE}$).

A second transmittance value $T_{WG1,TM}$ is equal to the ratio ($P_{WG1,TM}/P_{0,TM}$).

A third transmittance value $T_{WG2,TE}$ is equal to the ratio ($P_{WG2,TE}/P_{0,TE}$).

A fourth transmittance value $T_{WG2,TM}$ is equal to the ratio ($P_{WG2,TM}/P_{0,TM}$).

The polarization-selectivity of the polarizing device may be tailored e.g. by selecting the dimensions ($w_2,h_2,L_{TAP1}$) of the input portion TAP1 and the dimensions ($w_1,h_1$) of the first waveguide WG1.

By way of example, the dimensions may be selected e.g. as follows: $w_1$=3 µm, $h_1$=3 µm, $w_{min}$=0.5 $w_{max}$=1.5 µm, $h_2$=0.6 µm, $L_{TAP1}$=1.8 mm. By way of example, results obtained by optical simulations indicate that these dimensions may provide e.g. transmittance values $T_{WG2,TE}$=99.9%, $T_{WG1,TM}$=99.9%. In this example, the first waveguide WG1 may essentially consist of crystalline silicon (c-Si), and the second waveguide WG2 may essentially consist of amorphous silicon (a-Si). The wavelength $\lambda_0$ of the input light LB0 may be e.g. 1.55 µm.

In other words, results obtained by optical simulations indicate that the polarizing device 500 may be arranged to couple e.g. at least 99.9% of the power of the TE mode from the first waveguide WG1 to the second waveguide WG2, wherein e.g. at least 99.9% of the power of the TM mode may remain in the first waveguide WG1.

A first extinction ratio $\rho_1$ is equal to the ratio ($T_{WG1,TE}/T_{WG1,TM}$).

A second extinction ratio $\rho_2$ is equal to the ratio ($T_{WG2,TM}/T_{WG2,TE}$).

The dimensions ($w_2,h_2,L_{TAP1}$) of the input portion TAP1 and the dimensions ($w_1,h_1$) of the first waveguide WG1 may be selected such that the first extinction ratio $\rho_1$ is e.g. smaller than or equal to 5%, smaller than or equal to 1%, or even smaller than or equal to 0.1%.

The extinction ratio $\rho_1$=1% may represent good polarization selectivity regarding the light LB1. The extinction ratio $\rho_1$=1% may represent a situation where the TE mode may be almost completely coupled away from the first waveguide WG1, wherein the light LB1 remaining in the first waveguide WG1 may essentially consist of the TM mode.

The dimensions ($w_2,h_2,L_{TAP1}$) of the input portion TAP1 and the dimensions ($w_1,h_1$) of the first waveguide WG1 may be selected such that the second extinction ratio $\rho_2$ is e.g. smaller than or equal to 5%, smaller than or equal to 1%, or even smaller than or equal to 0.1%.

The extinction ratio $\rho_2$=1% may represent good polarization selectivity regarding the light LB2. The extinction ratio $\rho_2$=1% may represent a situation where only a very small fraction of the TM mode may leak from the first waveguide WG1 to the second waveguide WG2, wherein the light LB2 propagating in the second waveguide WG2 may essentially consist of the TE mode.

In an embodiment, the polarizing device may be arranged to provide a moderate polarization-selectivity (e.g. extinction ratio $\rho_2$=5%), e.g. in order to minimize the length of the tapered input portion TAP1.

The waveguides or waveguiding portions IN1, IN2, OUT1, OUT2, WG1, WG2, WG3, WG4, WG5 may mean waveguiding cores. The waveguides may be implemented e.g. as strip waveguides. The waveguides may be implemented e.g. as rib waveguides. The multimode portion CR12 of the interferometer MMI of FIG. 4a or 4b may be a strip waveguide.

The waveguides of the device 500 may be optionally covered with one or more cladding materials.

The waveguides of the polarizing device 500 may be partly or completely embedded in one or more filler materials (FILL1) e.g. in order to protect and/or support the waveguides.

The polarizing device 500 may also be implemented by using other materials than silicon.

The structure of the device 500 may also be implemented upside down. For example, the second waveguide WG2 may be located beneath the first waveguide WG1. For example, the second waveguide WG2 may be located between the first waveguide WG1 and a substrate SUB1.

The waveguides may comprise e.g. grown III-V materials. The first waveguide WG1 and/or the second waveguide may comprise e.g. gallium arsenide.

Various aspects are illustrated by the following examples.

Example 1. A polarizing device (500), comprising:
a first waveguide (WG1) to guide input light (LB0),
a second waveguide (WG2) to guide TE-polarized light (LB2),
wherein the second waveguide (WG2) comprises a tapered input portion (TAP1) to polarization-selectively couple TE-polarized light from the first waveguide (WG1) to the second waveguide (WG2), wherein the tapered input portion (TAP1) symmetrically overlaps the first waveguide (WG1), and the thickness ($h_2$) of the tapered input portion (TAP1) has been selected to substantially prevent coupling of TM-polarized light from the first waveguide (WG1) to the second waveguide (WG2), wherein the refractive index ($n_2$) of the second waveguide (WG2) is higher than the refractive index ($n_1$) of the first waveguide (WG1).

Example 2. The device (500) of example 1, comprising a first output portion (OUT1), wherein the second waveguide (WG2) comprises a tapered output portion (TAP2) to couple polarized light (LB2) from the second waveguide (WG2) to the first output portion (OUT1), wherein the first waveguide (WG1) and the first output portion (OUT1) are at the same height ($z_1$).

Example 3. The device (500) of example 2, comprising a second output portion (OUT2), and a transverse coupling region (CR12) to couple TM-polarized light from the first waveguide (WG1) to the second output portion (OUT2), wherein the first waveguide (WG1) and the first output portion (OUT1) are different portions of the same material layer (MAT1), and wherein the material layer (MAT1) supports the entire length of the second waveguide (WG2).

Example 4. The device (500) of example 3, wherein the first waveguide (WG1), the first output portion (OUT1), and the second output portion (OUT2) are disposed on a substrate (SUB1), and wherein the first waveguide (WG1), the first output portion (OUT1), and the second output portion (OUT2) are at the same height ($z_1$) with respect to the substrate (SUB1).

Example 5. The device (500) of example 3 or 4, wherein the device (500) comprises a multimode interferometer (MMI), wherein the first waveguide (WG1) is arranged to operate as a first input arm (IN1) of the interferometer (MMI), the first output portion (OUT1) is arranged to operate as a first output arm of the interferometer (MMI), the second output portion (OUT2) is arranged to operate as a second output arm of the interferometer (MMI), and an intermediate region of the material layer (MAT1) is arranged to operate as a multimode portion (CR12) of the interferometer (MMI), wherein the first waveguide (WG1), the multimode portion (CR12) and the first output portion (OUT1) together support the entire length of the second waveguide (WG2).

Example 6. The device (500) of example 3 or 4, comprising a directional coupler (ADI) to couple TM-polarized light from the first waveguide (WG1) to the second output portion (OUT2), wherein the second output portion (OUT2) is separated from the first waveguide (WG1) by a gap and/or by a spacer (SPC1).

Example 7. The device (500) of example 3 or 4, wherein the transverse coupling region (CR12) comprises an expansion region (REG1) to provide diverging TM-polarized light (LB1) from TM-polarized light (LB1) received from the first waveguide (WG1), and collecting optics (M1) to collect the diverging TM-polarized light (LB1) to the second output portion (OUT2), wherein the first waveguide (WG1), the expansion region (REG1) and the first output portion (OUT1) together support the entire length of the second waveguide (WG2).

Example 8. The device (500) of example 7, wherein the expansion region (REG1) supports a curved intermediate portion (INTER2) of the second waveguide (WG2).

Example 9. The device (500) of example 7 or 8, wherein the collecting optics (M1) comprises a focusing reflector.

Example 10. The device (500) according to any of examples 1 to 9, wherein the first waveguide (WG1) comprises crystalline silicon (c-Si), and the second waveguide (WG2) comprises amorphous silicon (a-Si).

Example 11. The device (500) according to any of examples 1 to 10, comprising a layer (O2) of silica ($SiO_2$) between the first waveguide (WG1) and the second waveguide (WG2), wherein the thickness ($h_0$) of the silica layer is smaller than 0.1 μm.

Example 12. The device (500) according to any of the examples 1 to 11, wherein the thickness ($h_2$) of the tapered input portion is in the range of 0.1 μm to 1 μm.

Example 13. A method for providing polarized light (LB2), the method comprising:
using a first waveguide (WG1) to guide input light (LB0), and
using a tapered input portion (TAP1) of a second waveguide (WG2) to couple TE-polarized light from the first waveguide (WG1) to the second waveguide (WG2),
wherein the tapered input portion (TAP1) symmetrically overlaps the first waveguide (WG1), and the thickness ($h_2$) of the input portion (TAP1) has been selected to substantially prevent coupling of TM polarized light from the first waveguide (WG1) to the second waveguide (WG2), wherein the refractive index ($n_2$) of the second waveguide (WG2) is higher than the refractive index ($n_1$) of the first waveguide (WG2).

Example 14. A method for providing polarized light (LB1, LB2, LB3) by using the polarizing device (500) according to any of the examples 1 to 12.

For the person skilled in the art, it will be clear that modifications and variations of the devices and methods according to the present disclosure are perceivable. The figures are schematic. The particular embodiments described above with reference to the accompanying drawings are illustrative only and not meant to limit the scope of the disclosed embodiments, which is defined by the appended claims.

The invention claimed is:

1. A polarizing device, comprising a multimode interferometer, wherein the multimode interferometer comprises:
a first waveguide to guide input light,
a first output portion,
a second output portion, and
wherein the polarizing device further comprises a second waveguide to guide TE-polarized light,
wherein the first waveguide is arranged to operate as a first input arm of the multimode interferometer, the first output portion is arranged to operate as a first output arm of the multimode interferometer, the second output portion is arranged to operate as a second output arm of the multimode interferometer, wherein the first waveguide and the first output portion are different portions of a same material layer, wherein an intermediate region of the material layer is arranged to operate as a multimode portion of the multimode interferometer to couple TM-polarized light from the first waveguide to the second output portion, wherein the first waveguide, the multimode portion and the first output portion together support an entire length of the second waveguide, wherein the second waveguide comprises a tapered input portion to polarization-selectively couple TE-polarized light from the first waveguide to the second waveguide, wherein the tapered input portion symmetrically overlaps the first waveguide, and a thickness of the tapered input portion has been selected to substantially prevent coupling of TM-polarized light from the first waveguide to the second waveguide, wherein a refractive index of the second waveguide is higher than a refractive index of the first waveguide.

2. The device of claim 1, wherein the second waveguide comprises a tapered output portion to couple polarized light from the second waveguide to the first output portion, wherein the first waveguide and the first output portion are at a same height.

3. The device of claim 1, wherein the first waveguide, the first output portion, and the second output portion are disposed on a substrate, and wherein the first waveguide, the first output portion, and the second output portion are at a same height with respect to the substrate.

4. The device of claim 1, wherein the thickness of the tapered input portion has been selected to be so small that the second waveguide does not effectively confine TM-polarized light.

5. The device of claim 1, wherein the first waveguide comprises crystalline silicon, and the second waveguide comprises amorphous silicon.

6. The device of claim 1, comprising a layer of silica between the first waveguide and the second waveguide, wherein a thickness of the silica layer is smaller than 0.1 µm.

7. The device of claim 1, wherein the thickness of the tapered input portion is in a range of 0.1 µm to 1 µm.

8. A method for providing polarized light by using a polarizing device, which comprises a multimode interferometer, wherein the multimode interferometer comprises:
a first waveguide to guide input light,
a first output portion, and
a second output portion,
wherein the polarizing device further comprises a second waveguide to guide TE-polarized light, wherein the first waveguide is arranged to operate as a first input arm of the multimode interferometer, the first output portion is arranged to operate as a first output arm of the multimode interferometer, the second output portion is arranged to operate as a second output arm of the multimode interferometer, wherein the first waveguide and the first output portion are different portions of a same material layer, wherein an intermediate region of the material layer is arranged to operate as a multimode portion of the multimode interferometer to couple TM-polarized light from the first waveguide to the second output portion, wherein the first waveguide, the multimode portion and the first output portion together support an entire length of the second waveguide, wherein the second waveguide comprises a tapered input portion to polarization-selectively couple TE-polarized light from the first waveguide to the second waveguide, wherein the tapered input portion symmetrically overlaps the first waveguide, and a thickness of the tapered input portion has been selected to substantially prevent coupling of TM-polarized light from the first waveguide to the second waveguide, wherein a refractive index of the second waveguide is higher than a refractive index of the first waveguide.

9. The method of claim 8, comprising:
using the first waveguide to guide input light, and
using the tapered input portion of the second waveguide to couple TE-polarized light from the first waveguide to the second waveguide.

10. The method of claim 8, wherein the second waveguide comprises a tapered output portion to couple polarized light from the second waveguide to the first output portion, wherein the first waveguide and the first output portion are at a same height.

11. The method of claim 8, wherein the first waveguide, the first output portion, and the second output portion are disposed on a substrate, and wherein the first waveguide, the first output portion, and the second output portion are at a same height with respect to the substrate.

12. The method of claim 8, wherein the thickness of the tapered input portion has been selected to be so small that the second waveguide does not effectively confine TM-polarized light.

13. The method of claim 8, wherein the first waveguide comprises crystalline silicon, and the second waveguide comprises amorphous silicon.

14. The method of claim 8, wherein the polarizing device comprises a layer of silica between the first waveguide and the second waveguide, wherein a thickness of the silica layer is smaller than 0.1 µm.

15. The method of claim 8, wherein the thickness of the tapered input portion is in a range of 0.1 µm to 1 µm.

* * * * *